(12) United States Patent
Miyagawa et al.

(10) Patent No.: US 7,360,250 B2
(45) Date of Patent: Apr. 15, 2008

(54) ILLEGAL ACCESS DATA HANDLING APPARATUS AND METHOD FOR HANDLING ILLEGAL ACCESS DATA

(75) Inventors: Akiko Miyagawa, Tokyo (JP); Toru Inada, Tokyo (JP); Shinobu Ushirozawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 888 days.

(21) Appl. No.: 09/991,932

(22) Filed: Nov. 26, 2001

(65) Prior Publication Data

US 2002/0112190 A1 Aug. 15, 2002

(30) Foreign Application Priority Data

Feb. 14, 2001 (JP) ............................. 2001-036436

(51) Int. Cl.
*G06F 7/04* (2006.01)
*G06F 17/30* (2006.01)
*H04L 9/00* (2006.01)
*H04L 9/32* (2006.01)

(52) U.S. Cl. ............................ 726/23; 726/27; 709/224

(58) Field of Classification Search ................ 713/201, 713/182; 726/23, 27

See application file for complete search history.

(56) References Cited

U.S. PATENT DOCUMENTS 5,414,833 A * 5/1995 Hershey et al. ............. 713/201

(Continued)

FOREIGN PATENT DOCUMENTS

JP A6-006347 1/1994

(Continued)

OTHER PUBLICATIONS

Verwoerd, Theuns; "Active Network Security;" XP-002282654; Department of Computer Science, University of Canterbury, Christchurch, New Zealand; Nov. 5, 1999; retrieved from Internet: <URL: http://www.cosc.canterbury.ac/nz/research/reports/HonsReps/1999/hons_9909.pdf> on May 20, 2004.

(Continued)

*Primary Examiner*—Gilberto Barron
*Assistant Examiner*—Abdulhakim Nobahar
(74) *Attorney, Agent, or Firm*—Birch, Stewart, Kolasch & Birch, LLP (57) ABSTRACT

To provide a centralized control system for defending and taking countermeasures against an illegal access. A network device 3 detects an illegal access packet P1 transmitted from an illegal accessor's terminal 6, and transfers an encapsulated packet P2 of the illegal access packet P1 to a data center 1. A control system 11 in the data center 1 analyzes the packet P2, encapsulates a response packet P4 from a decoy server 13 pretending to be a response from a target server to be attacked 5 to acquire a packet P3, and then transmits the packet P3 to the network device 3. The network device 3 decapsulates the packet P3 so as to extract a response packet P4, and transmits the response packet P4 to the illegal accessor's terminal 6. The illegal accessor's terminal 6, upon reception of the response packet P4, would believe that the response packet P4 should be transmitted from the server 5, and start to illegally access the decoy server 13.

16 Claims, 10 Drawing Sheets

U.S. PATENT DOCUMENTS

| | | | |
|---|---|---|---|
| 6,321,337 B1* | 11/2001 | Reshef et al. ................ | 713/201 |
| 6,363,489 B1* | 3/2002 | Comay et al. ................. | 726/22 |
| 6,678,827 B1* | 1/2004 | Rothermel et al. .......... | 713/201 |
| 6,687,833 B1* | 2/2004 | Osborne et al. ............... | 726/23 |
| 6,826,697 B1* | 11/2004 | Moran ......................... | 713/201 |
| 6,880,090 B1* | 4/2005 | Shawcross ................... | 726/14 |
| 2002/0023227 A1* | 2/2002 | Sheymov et al. ........... | 709/224 |
| 2003/0051026 A1* | 3/2003 | Carter et al. ................. | 713/201 |
| 2004/0117478 A1* | 6/2004 | Triulzi et al. ................ | 709/224 |

FOREIGN PATENT DOCUMENTS

| | | |
|---|---|---|
| JP | 09-214543 A | 8/1997 |
| JP | 09-214556 A | 8/1997 |
| JP | A2000-47987 | 2/2000 |
| JP | A2000-90031 | 3/2000 |
| JP | 2000-261483 | 9/2000 |
| WO | WO 92/03001 A1 | 2/1992 |
| WO | WO 00/69120 A1 | 11/2000 |
| WO | WO 00/72171 A1 | 11/2000 |
| WO | WO 01/37511 A2 | 5/2001 |

OTHER PUBLICATIONS

Moran, Douglas B.; "Trapping and Tracking Hackers: Collective security for survival in the Internet age;" XP-002282655; ISW 2000. Information Survivability Workshop. Third Information Survivability Workshop—ISW-2000. "Research Directions and Research Collaborations to Protect the Global Information Society," Proceedings of ISW 2000. 34$^{th}$ Information Survivability WO; pp. 131-134.

Hucom Security Team, "Product Information Cutting-Edge Technologies for Security with the Introduction of Illegal Access Detection system", Nikkei Joho Strategy (Nikkei Information Strategy); Feb. 1998.

Nikkei Communications Sep. 20, 1999, Feature 94, "Security Measures Handled by Specialists".

* cited by examiner

ILLEGAL ACCESS DATA HANDLING APPARATUS AND METHOD FOR HANDLING ILLEGAL ACCESS DATA

BACKGROUND OF THE INVENTION

1. Field of the Invention

The present invention relates to a control system for providing a security support contractor in a computer network with a means for decoying an illegal accessor into a decoy server, based upon information given by a contractor's network device which detects an illegal access.

2. Description of the Related Art

It has been a mainstream with conventional network systems that an organization such as a corporation takes security measures individually on an organization basis by using a network component device and a control device having an illegal access detecting function.

For instance, a system disclosed in Japanese Unexamined Patent Publication No. 2000-90031 is provided with a network illegal access analysis system between routers for intercepting a communication between the communicating parties when detecting an illegal access in the communication. According to a system disclosed in Japanese Unexamined Patent Publication No. 2000-47987, when detecting an illegal access, the illegal access is decoyed into a pseudo-database, which is specially provided besides a regular database, thereby saving regular data from flowing out. A system disclosed in Japanese Unexamined Patent Publication No. Hei6-6347 is provided with a security controller, which is informed by a network component device of an illegal access when detected, thereby achieving a centralized security control.

All of those are based upon the method that a client managing a network such as a corporation installs a system and controls the system by itself.

However, according to the conventional network systems, if the organization is small in size, a problem occurs in acquiring a network manager and educating management know-how.

In addition to that, even if a full-time network manager is available, because the network manager is responsible for controlling all the network devices and control systems, he or she has to spare great efforts in setting, modifying and maintaining the network devices.

Furthermore, modifying a network configuration, installing a new network against a new approach of illegal access, and upgrading a network version are costly, and those have not been handled promptly.

With the systems disclosed in Japanese Unexamined Patent Publication No. 2000-47987 and Japanese Unexamined Patent Publication No. Hei6-6347, for instance, the manager is entrusted to be in charge of handling an illegal access when detected. Specifically, with the system disclosed in Japanese Unexamined Patent Publication No. 2000-47987, although the system is designed to decoy an illegal accessor into a pseudo-database, the organization managing the network itself is expected to install the pseudo-database.

SUMMARY OF THE INVENTION

The present invention is directed to solving the problems identified above, and it is an object of the present invention to provide a centralized control system for a network user or manager for defending and taking countermeasures against an illegal access.

The service user using such a centralized control system has an advantage of reducing the cost of managing the network by entrusting a special service provider to handle the installation of a decoy server (pseudo-server), log analysis, and the creation of a response packet.

Furthermore, the service provider is allowed to provide the service user with a prompt service without visiting the service user because the centralized control system allows the service provider to grasp the condition of the network device of the service user all the time from a distant place.

These and other objects of the embodiments of the present invention are accomplished by the present invention as hereinafter described in further detail.

According to one aspect of the present invention, an illegal access data handling apparatus, which is placed outside a given internal communication network, receives illegal access data transmitted from a data communication device placed outside the internal communication network for a purpose of illegally accessing the internal communication network, and takes countermeasures against the illegal access data received.

The illegal access data handling apparatus may be connected to an illegal access data detection device for relaying a data communication between a data communication device placed within the internal communication network and a data communication device placed outside the internal commination network, and for detecting the illegal access data, and wherein the illegal access data handling apparatus receives the illegal access data from the illegal access data detection device.

According to another aspect of the present invention, a method for handling illegal access data outside a given internal communication network includes the steps of receiving illegal access data transmitted from a data communication device placed outside the internal communication network for a purpose of illegally accessing the internal communication network, and taking countermeasures against the illegal access data received.

The method may further include the steps of communicating with an illegal access data detection device for relaying a data communication between a data communication device placed within the internal communication network and a data communication device placed outside the internal commination network, and for detecting the illegal access data, and receiving the illegal access data from the illegal access data detection device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Reference will now be made in detail to the present preferred embodiments of the invention, examples of which are illustrated in the accompanying drawings, wherein like reference numerals indicate like elements through out the several views.

Embodiment 1

Figure 1:
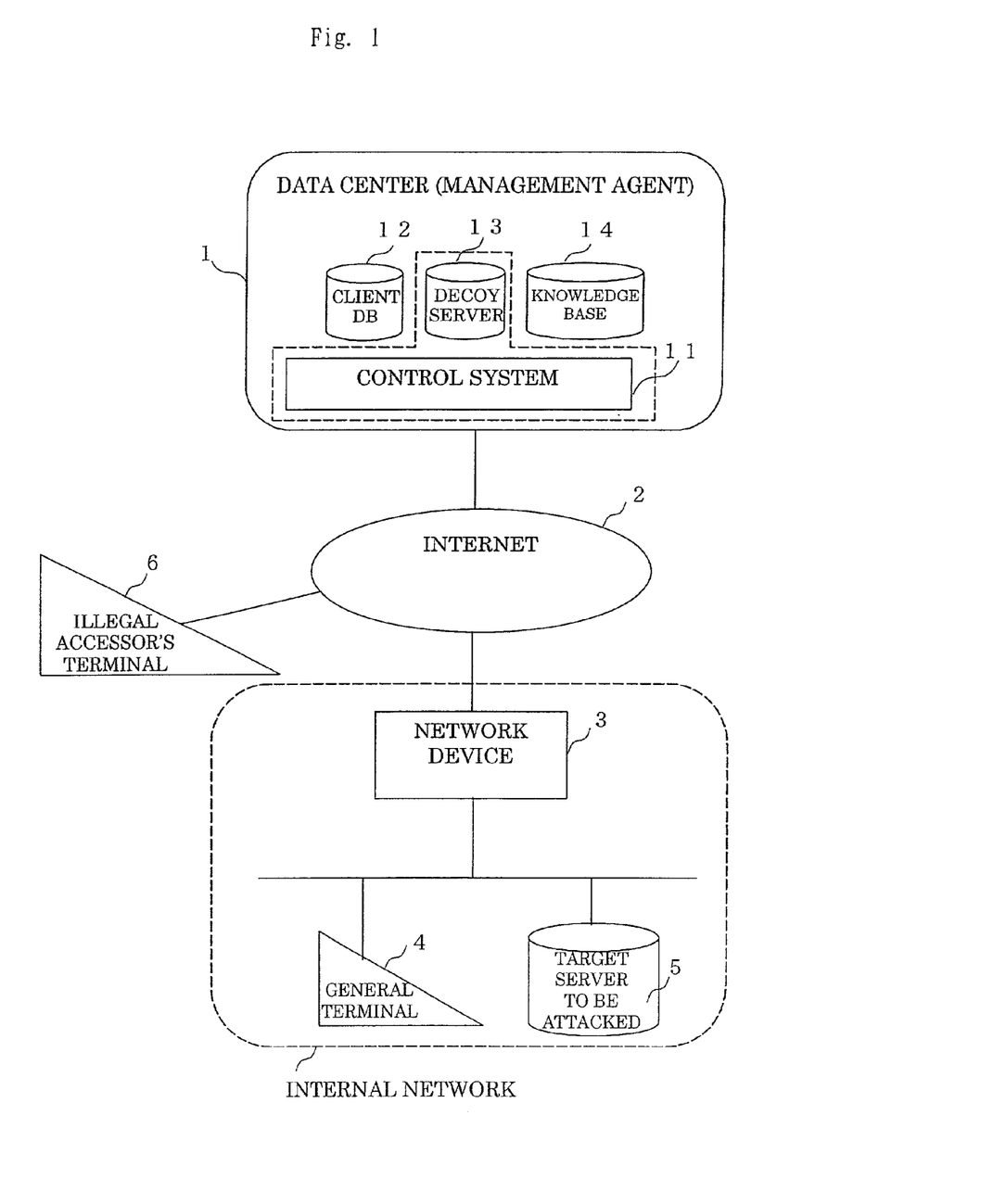
FIG. 1 is an overall structural view of a network system.

FIG. 1 is an overall structural view of a network system including an illegal access data handling apparatus according to the present invention.

Referring to FIG. 1, a reference numeral 1 denotes a data center of a management agent providing a service for taking countermeasures against an illegal access. A reference numeral 11 denotes a control system provided in the data center. A reference numeral 12 denotes a client database for storing client information. A reference numeral 13 denotes a decoy server for decoying an illegal accessor in order to obtain information of the illegal accessor. A reference numeral 14 denotes a knowledge base to be used for analyzing illegal access information of the illegal accessor. A reference numeral 2 denotes the Internet. A reference numeral 3 denotes a network device used by a service contractor of the service of taking countermeasures against an illegal access. A reference numeral 4 denotes a general terminal used by the service contractor. A reference numeral 5 denotes a target server to be attacked, which is owned by the service contractor and targeted by the illegal accessor. A reference numeral 6 denotes an illegal accessor's terminal.

Specifically, the control system 11 and the decoy server 13 function as the illegal access data handling apparatus, and the network device 3 functions as an illegal access data detection device.

Furthermore, the network device 3, the general terminal 4 and the target server to be attacked 5 belong to the same internal communication network.

Figure 2:
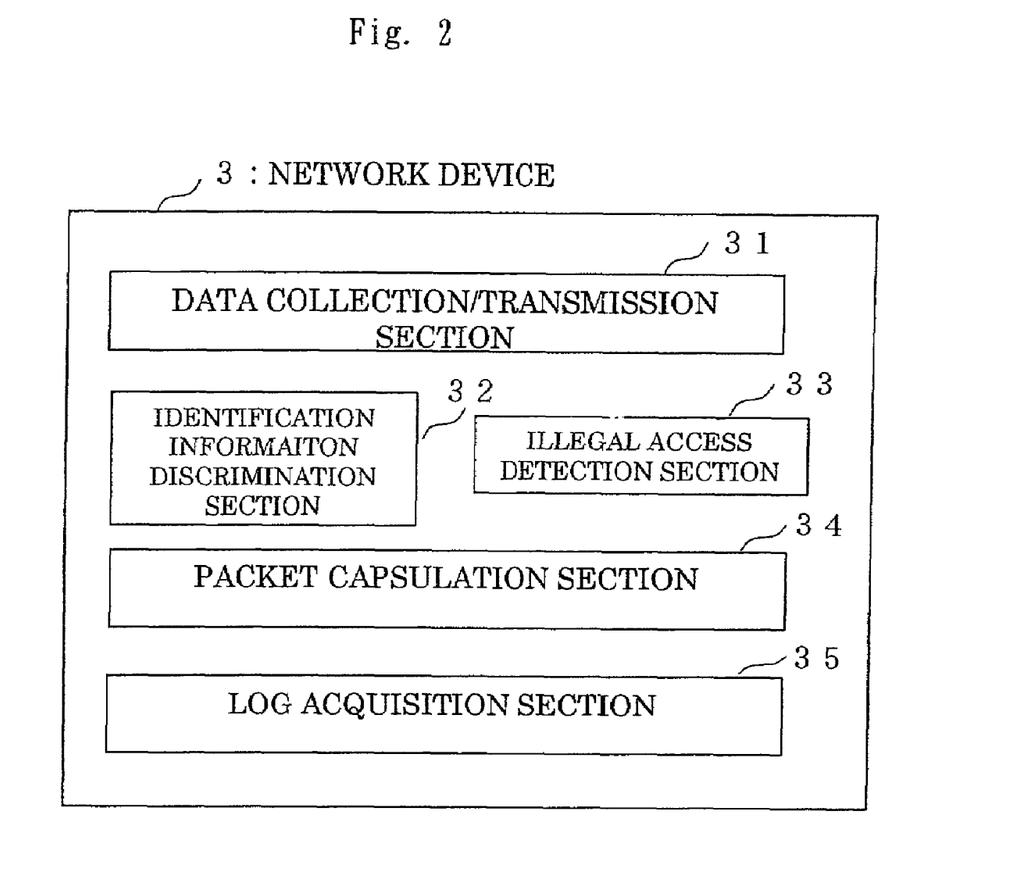
FIG. 2 shows a functional block diagram of a network device.

FIG. 2 shows a functional block diagram of the network device 3.

The network device 3 is composed of a data collection/transmission section 31 for receiving and transmitting data, an identification information discrimination section 32 for discriminating between a general communication and a decoying packet (response packet) to the decoy server from the control system 11, an illegal access detection section 33 for detecting an illegal access packet, a packet capsulation section 34 for encapsulating the illegal access packet or log data to be transferred to the control system 11, and for decapsulating the response packet transmitted from the control system 11, and a log acquisition section 35 for recording data processed through the network device 3.

Figure 3:
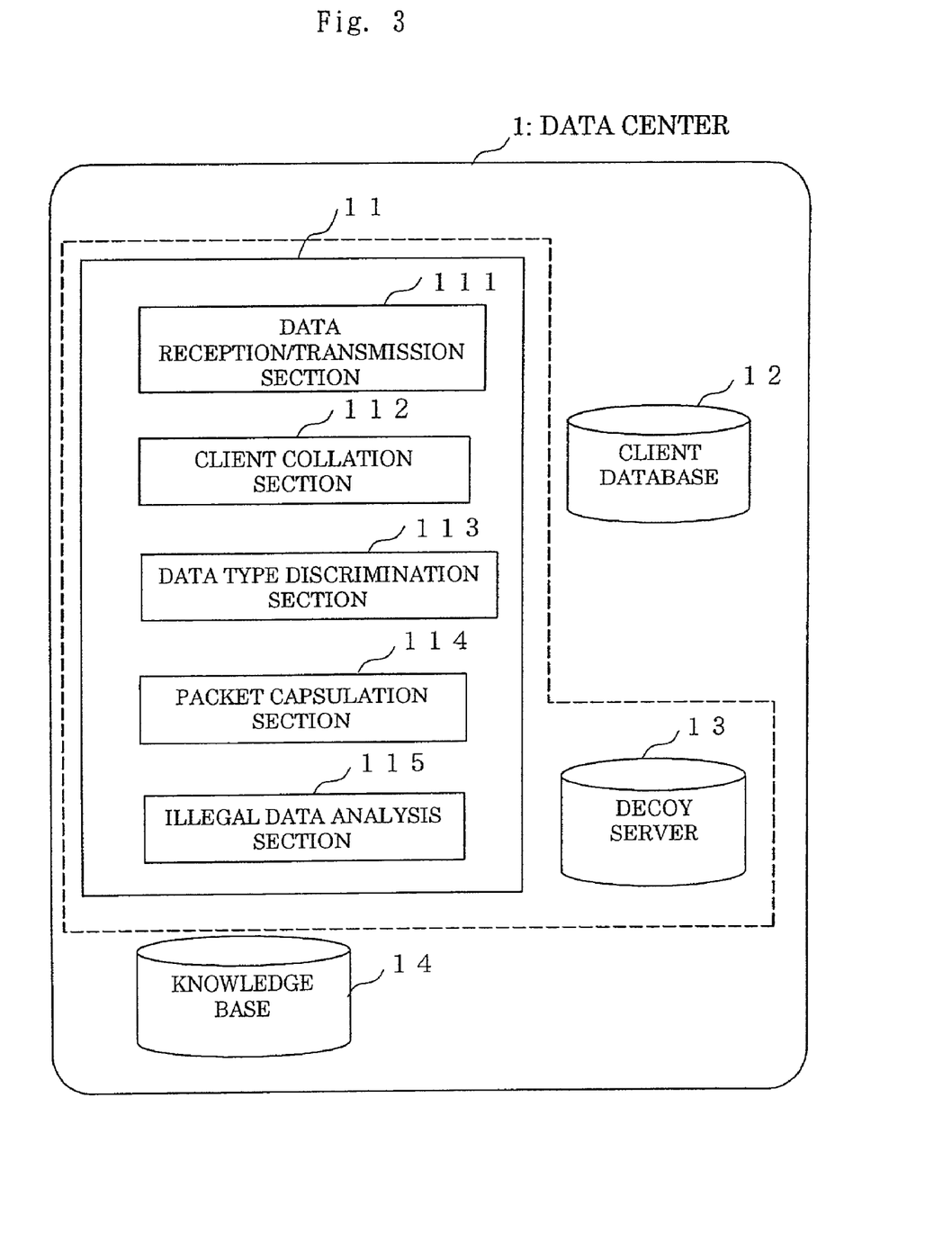
FIG. 3 shows a functional block diagram of a data center.

FIG. 3 also shows a functional block diagram of the control system.

The control system 11 is composed of data reception/transmission section 111 for receiving and transmitting data, a client collating section 112 for collating a packet received whether to be transferred from a contractor or not, a data type discrimination section 113 for discriminating the type of data received from the network device 3, a packet capsulation section 114 for decapsulating an encapsulated illegal access packet or an encapsulated log data transmitted from the network device 3 and for encapsulating a response packet (response data) to be transmitted to the network device 3, and an illegal data analysis section 115 for analyzing the log data or illegal access packet received.

In addition to that, the data center 1 is also provided with the client database 12, the decoy server 13, and the knowledge base 14 for exchanging data with the control system 11.

Still more, the decoy server 13 functions as a response data generation section for generating the response data (response packet) to the illegal access packet.

Figure 4:
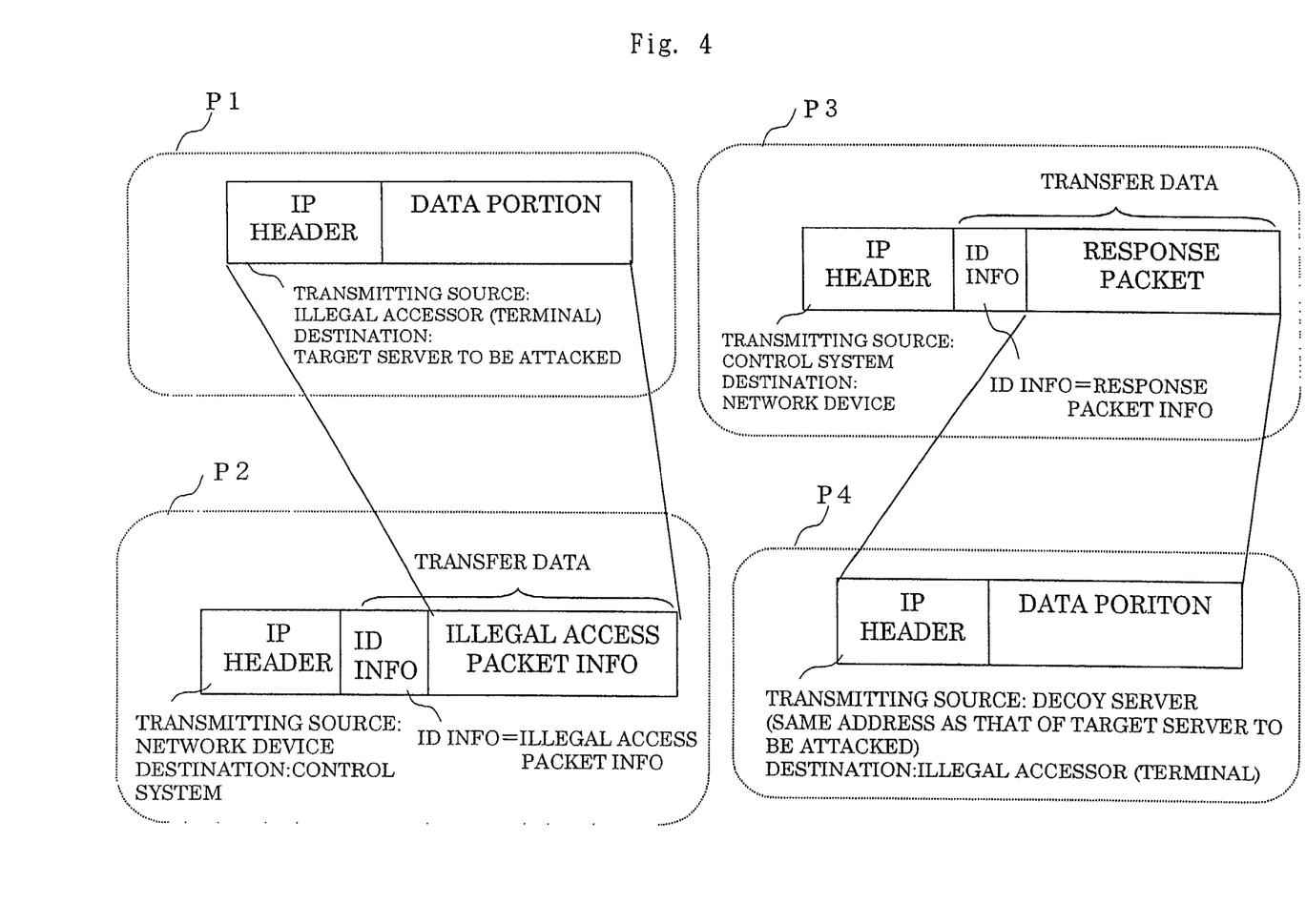
FIG. 4 is a diagram illustrating the structures of communication packets P1 to P4.

FIG. 4 shows the structures of communication packets transmitted and received by the network device 3 and the control system 11.

A packet P1 is the illegal access packet. The packet P1 is transmitted from the illegal accessor's terminal 6 and received by the network device 3.

A packet P2 is an encapsulated packet of the packet P1 for transmitting illegal access packet information including identification information. The packet P2 is transmitted from the network device 3 to the control system 11.

A packet P3 is an encapsulated response packet for transmitting response packet information including the identification information to the illegal accessor. The packet P3 is transmitted from the control system 11 to the network device 3.

A packet 4 is a decapsulated packet of the packet P3, and is the response packet from the decoy server 13 pretending to be the response from the target server to be attacked 5. The packet P4 has the same information stored as the contents of the response by the target server to be attacked 5. Normally, the packet P4 is not allowed to be transmitted directly over the Internet, but if encapsulated as shown in the packet P3, allowed to be transmitted to the network device 3.

An overall network system operation is now discussed.

Figure 5:
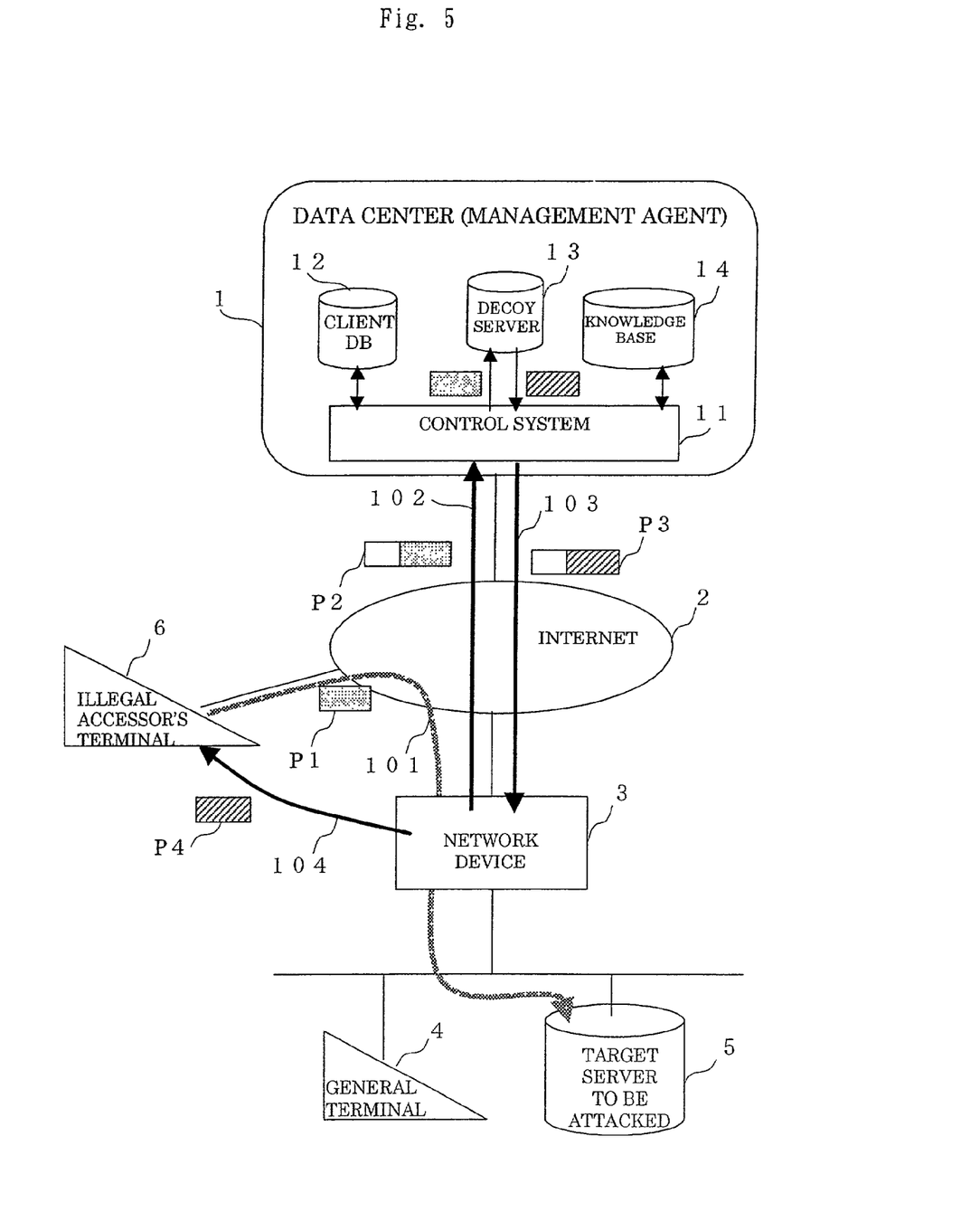
FIG. 5 shows a diagram illustrating a procedure for handling an illegal access packet according to a first embodiment.

FIG. 5 shows an operational flow for handling an illegal access made by an illegal accessor into an internal communication network.

Initially, it is assumed that the illegal accessor's terminal 6 has transmitted the illegal access packet P1 so as to illegally access the server (the target server to be attacked) 5 provided within the network (the internal communication network) of a contractor (step 101).

Then, the network device 3 detects the illegal access packet P1. The network device 3, when detecting the illegal access packet P1, encapsulates the illegal access packet P1 (the illegal access packet information) to generate the packet P2, and transmits the packet P2 to the data center 1 (step 102). This allows the network device 3 to prevent the illegal access by the illegal access packet P1 to the target server to be attacked 5.

Subsequently, the control system 11 in the data center 1 receives the packet P2 from the network device 3, analyzes the packet P2 received, encapsulates the response packet P4 from the decoy server 13 pretending to be a response from the target server to be attacked 5 to generate the packet P3, and sends the packet P3 back to the network device 3 (step 103).

Then, the network device 3 receives the packet P3 from the control system 11, decapsulates the packet P3 received so as to extract the response packet P4, and transmits the response packet P4 to the illegal accessor's terminal 6 (step 104). The illegal accessor would believe that the response packet P4 should be a response from the target server to be attacked 5, and start to illegally access the decoy server 13.

A communication between the illegal accessor's terminal 6 and the decoy server 13 is made each time through a procedure from step 101 to step 104. A log analysis performed in the decoy server 13 exposes the approach of an illegal access in more detail.

An operation of the network device 3 is now discussed.

Figure 6:
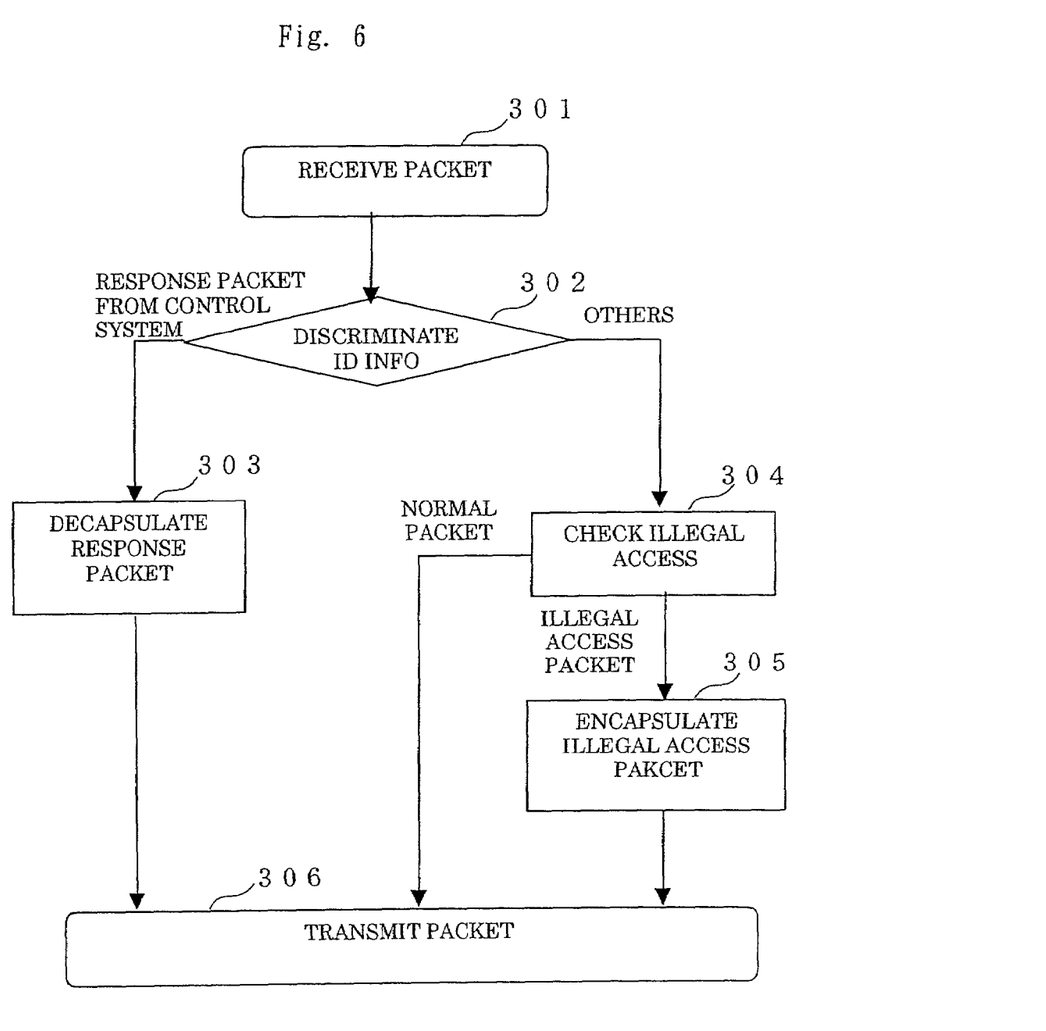
FIG. 6 is a diagram illustrating an operational flow by the network device.

FIG. 6 is a flow chart illustrating the processing of a communication packet in the network device 3.

Firstly, the network device 3, upon reception of a communication packet through the data collection/transmission section 31 (step 301), discriminates between the encapsulated response packet P3, which is from the control system 11, and only a relay packet based upon the identification information of the received packet in the identification information discrimination section 32 (step 302).

As a result of this discrimination, if the received packet is the encapsulated response packet P3, the encapsulated response packet P3 is decapsulated in the packet capsulation section 34 (step 303), and then transmitted to the illegal accessor's terminal 6 as the response (step 306).

On the other hand, if the received packet is only a relay packet, the packet is examined in the illegal access detection section 33 whether it is the illegal access packet P1 or not (step 304). In the case that the packet is judged to be the illegal access packet P1, the illegal access packet P1 is encapsulated in the packet capsulation section 34 to have the packet P2, in order to transfer the illegal access packet P1 to the control system 11 (step 305). Then, the encapsulated illegal access packet P2 is transmitted to the control system 11 through the data collection/transmission section 31 (step 306).

In the case that the packet is judged to be a normal packet in the illegal access examination in step 304, then the packet is relayed directly to the destination from the data collection/transmission section 31 (step 306).

An operation of the control system 11 is now discussed.

Figure 7:
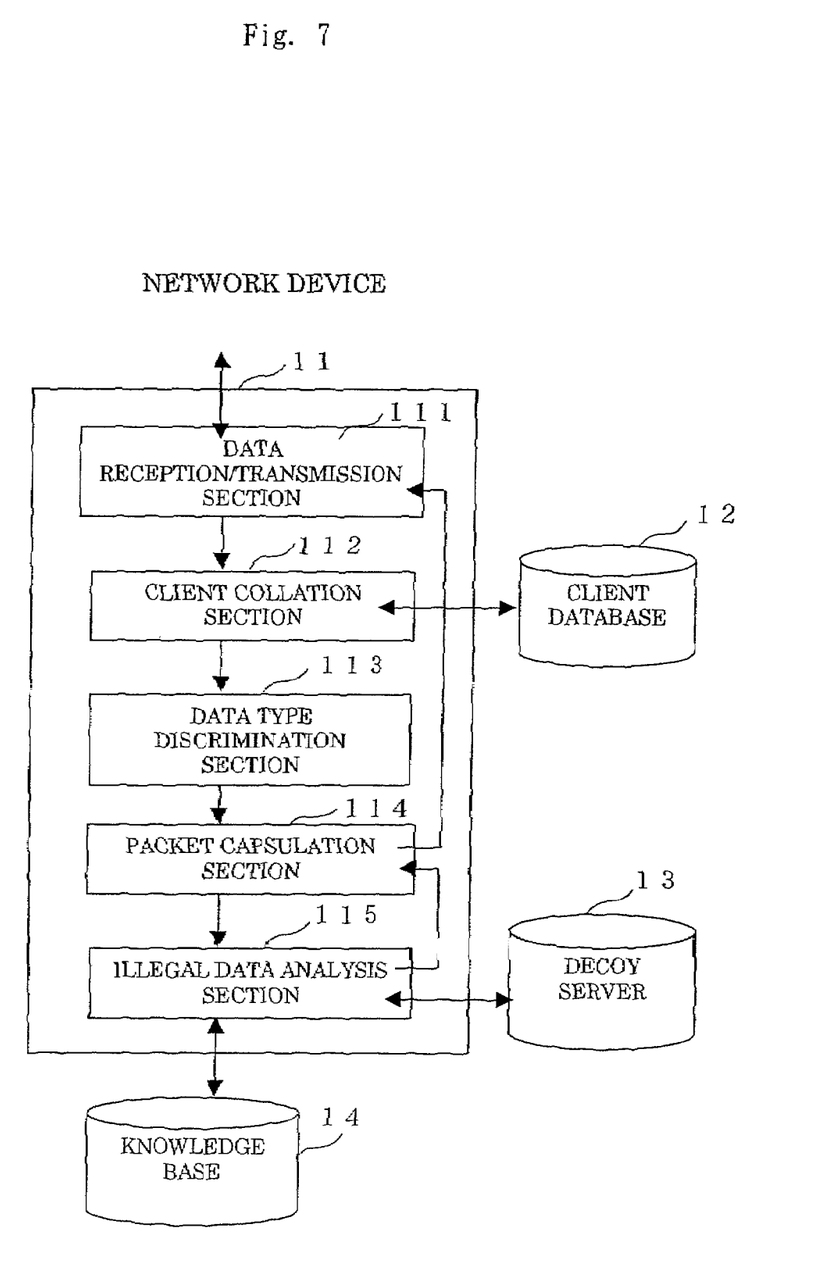
FIG. 7 is a diagram illustrating an operational flow by the data center.

FIG. 7 shows an operational flow in the control system 11 for handling a received packet from the network device 3 of a contractor.

First, the control system 11, upon reception of a communication packet through the data reception/transmission section 111, refers to the client database 12 and collates the communication packet to find whether to be transmitted from a contractor or not. A packet failing to succeed in this collation may be disposed as incorrect data or handled in another task of the control system (outside the scope of the present invention).

When succeeded in the collation of the received packet, it is judged by the data type discrimination section 113 whether or not the data of the packet transmitted from the network device 3 is the data of the illegal access packet transferred (packet P2).

Then, the packet P2 received, which is encapsulated by the network device 3, is decapsulated in the packet capsulation section 114.

Then, the illegal access packet P1, when decapsulated in the packet capsulation section 114, is passed to the illegal data analysis section 115. The illegal data analysis section 115 analyzes the illegal access packet P1 extracted by referring to the knowledge base 14. A result from this analysis is added to the knowledge base 14 as an example for reference in future analyses. The illegal data analysis section 115 notifies the decoy server 13 of an analysis result, and receives the response packet P4 from the decoy server 13. The response packet P4 has the same information as the information that would be provided in response to the illegal access packet P1 by the target server to be attacked 5 if the illegal access packet P1 was received by the target server to be attacked 5.

In order to pretend that the response packet P4 is a packet transmitted from the target server to be attacked 5 through the network device 3, the response packet P4 is encapsulated in the packet capsulation section 114 to be the packet P3. Then, the packet P3 is transmitted to the network device 3 through the data reception/transmission section 111.

Hereafter, the network device 3, as mentioned above, decapsulates the packet P3, extracts the response packet P4, and transmits the response packet P4 extracted to the illegal accessor's terminal 6.

As aforementioned, the network device 3 does not handle within itself the illegal access packet detected by the network device 3 but transmits the illegal access packet to the control system 11, thereby obtaining the response packet and decoying the illegal accessor into the decoy server provided within the data center of the agent. As a result, an illegal access handling service independent of the network of a client may be achieved.

Embodiment 2

With reference to the first embodiment discussed above, the illegal access packet from the illegal accessor's terminal is transferred from the network device 3 to the data center 1. Another embodiment will be discussed in the case that the log information of the network device 3 is transferred to the data center 1 in order to detecting an illegal access packet in an earlier stage.

Figure 8:
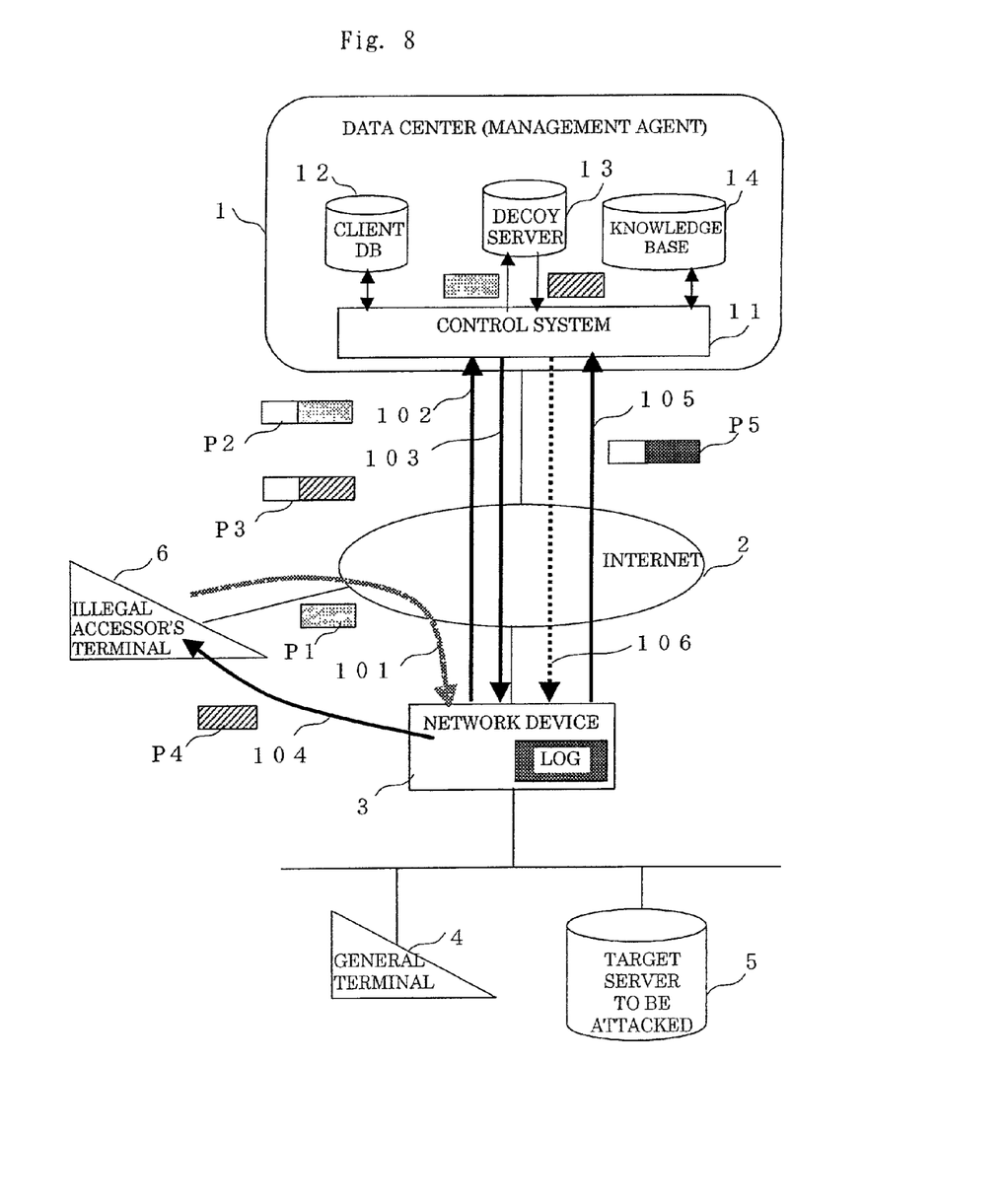
FIG. 8 is a diagram illustrating a procedure for handling an illegal access packet according to a second embodiment.

FIG. 8 shows the operation of an overall network system in such a case.

Referring to the figure, step 101 to step 104 are the same as those discussed in the first embodiment, therefore, step 105 and step 106 will be discussed in this embodiment.

The network device 3 always records the information of access from outside by the log acquisition section 35 (FIG. 2). This log information (communication history information) is encapsulated and transmitted to the control system 11 as the packet P5 upon reception of an order from the control system 11 or by a regular trigger of the network device 3 itself (step 105).

Figure 9:
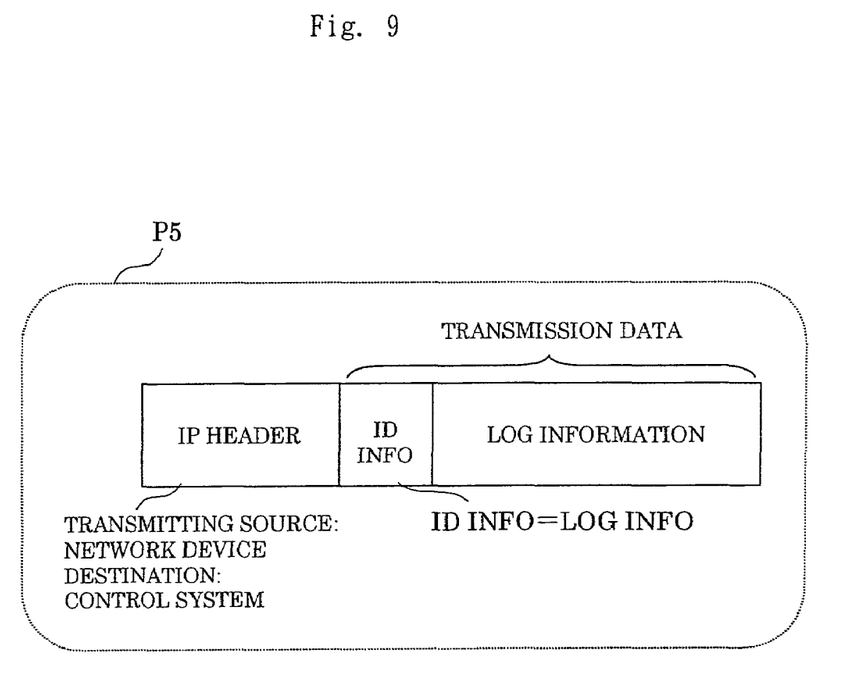
FIG. 9 is a diagram illustrating the structure of a communication packet P5.

Specifically, FIG. 9 shows the structure of the packet P5. The packet P5 is an encapsulated packet of the log information, which is used for transmitting the log information of the network device to the control system.

Subsequently, in the control center 11, the packet capsulation section 114 decapsulates the packet P5, and the illegal data analysis section 115 analyzes the log information. At this stage, if a problem occurs, and in other words, in case that a packet suspected of an illegal access packet is detected, the control system 11 transmits new illegal access detection set information to the network device 3 in order to update set information in the illegal access detection section 33 in the network device 3 (step 106). Specifically, the illegal access detection set information is such information as to inform the network device 3 of a packet suspected of an illegal access packet, and instruct the network device 3 to treat any packet transmitted thereafter from the terminal transmitting the packet suspected of an illegal access packet as an illegal access packet. In other words, the illegal access detection set information corresponds to illegal access data designation information. Besides, the illegal access detection set information is generated by the illegal data analysis section 115.

Thereafter, any access by the transmitting source suspected of making an illegal access is determined to be an illegal access packet by the illegal access detection section 33 in the network device 3. For example, the control center 11, when determining that an access log from the terminal 6 is illegal, transmits to the network device 3 the set information instructing to reject the access from the terminal 6. As a result, the network device 3 detects the access from the terminal 6 (step 101) as an illegal access packet, encapsulates the packet from the terminal 6 (P1: illegal access packet to form P2, and then transmits the encapsulated packet to the control system 11 (step 102). The subsequent procedures are the same as those discussed in the first embodiment.

The operations of the network device 3 and the control system 11 of this embodiment are almost the same as those discussed in the first embodiment.

However, in the control system 11, the data type discrimination section 113 shown in FIG. 6 judges that the received packet from the network device 3 is not an encapsulated illegal access packet P2 but a log information packet P5 based upon the identification information included in the received data. Then, in the illegal data analysis section 115, the log information packet is analyzed.

In addition to that, in the control system 11, the illegal data analysis section 115, when detecting a packet suspected of an illegal access packet, generates new illegal access set detection information. The data reception/transmission section 111 transmits generated new illegal access set detection information to the network device 3.

Thus, a centralized analysis is requested by transmitting the log information of the network device 3 to the control system 11, and as a result, the response packet is acquired, so that the illegal accessor is decoyed into the decoy server provided within the data center of the agent. For that reason, the illegal access handling service may be achieved independently of the client's network. In addition to that, avoiding the illegal access of a packet suspected of an illegal access, although it is not a direct attack, may contribute to an earlier detection of an illegal access.

Embodiment 3

With reference to the first and the second embodiments discussed above, the transmitting packet is encapsulated and the contents of the transmitting data is discriminated based upon the identification information.

Another embodiment will be discussed in the case that authentication information is added to a packet to be transmitted/received from/at the control system 11 and the network device 3.

Figure 10:
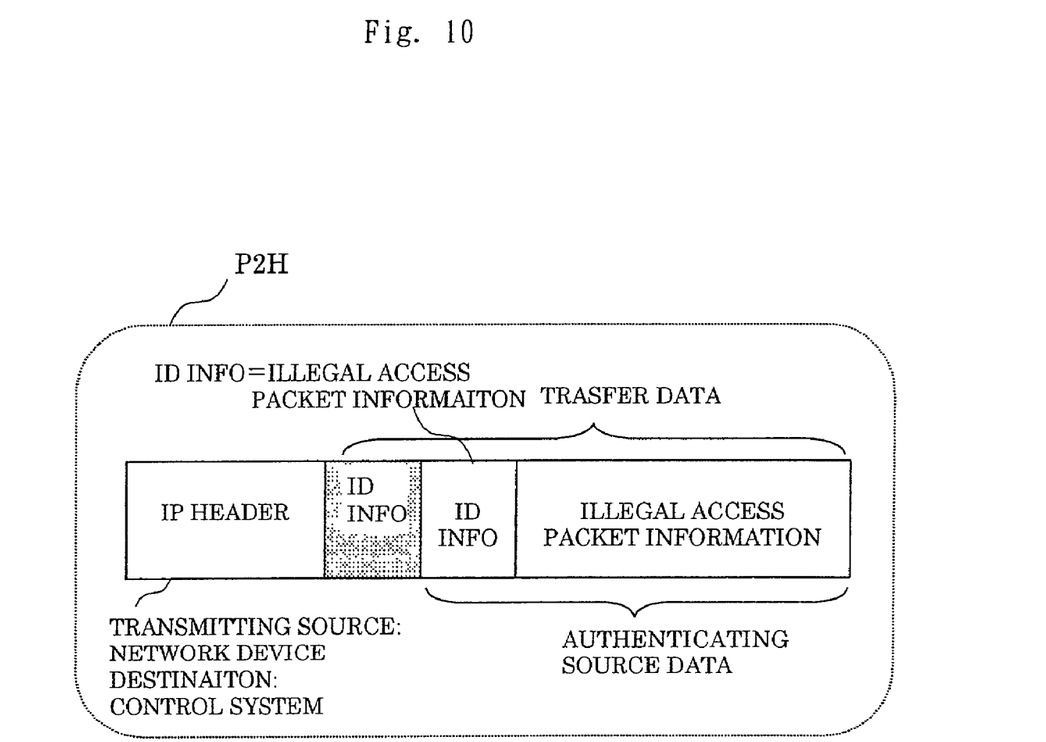
FIG. 10 is a diagram illustrating the structure of a communication packet P2H.

FIG. 10 shows a packet P2H, which has authentication information added to the packet P2 as an example.

The packet P2H has authentication information such as hash information which uses identification information and the following data as an input value, added in front of the identification information.

The authentication information is added and checked in the network device 3 in the process of encapsulation/decapsulation by the packet capsulation section 34. The authentication information is added and checked in the control system 11 in the process of encapsulation/decapsulation by the packet capsulation section 114.

Still more, in the above case, the explanation is made with the packet P2H which is formed by adding the authentication information to the packet P2. However, a packet P3H of the same structure, which is formed by adding the authentication information to the packet P3, can be also transmitted/received.

Thus, adding the authentication information to a communication packet has a positive effect of improving communication security between the control system and the network device.

In the first embodiment through the third embodiment, the illegal access data handling apparatus according to the present invention has been discussed. In addition to that, a method for handling illegal access data according to the present invention may also be achieved by using the same procedures as those discussed in the previous embodiments.

The following is the summary of the characteristics of the system which have been discussed in the first to the third embodiments.

The system is to provide the network of a support contractor with a centralized network security control service for handling an illegal access to a computer network system.

As an item of the centralized control service, an illegal accessor is decoyed into the decoy server of the support provider.

The network device of the service user, when detecting an illegal access, attaches control information (encapsulation) to the illegal access packet, and then transfers the illegal access packet to the control system in the data center of the service provider. The data center is provided with the control system, the pseudo-server (referred to here as the decoy server), and the like. The decoy server is to decoy the illegal accessor by pretending to be the target server to be attacked of the service user, which is targeted by the illegal accessor, so that it sends back the same response as that of the target server to be attacked. The control system detaches the control information from the illegal access packet transmitted (decapsulation) and makes an analysis of the illegal access. In addition to that, the control system encapsulates a response from the decoy server, and transfers the response encapsulated to the network device.

The network device, upon reception of the response packet from the control center, decapsulates the response packet and then transmits the packet. The illegal accessor would believe that this response packet should be a response from the target server to be attacked, but in fact, is to communicate with the decoy server of the data center through the network device. Thus, the illegal accessor is to be decoyed into the decoy server.

The system provides the network of a support contractor with the centralized network security control service for handling an illegal access to a computer network system.

An item of the centralized control service is to decoy an illegal accessor into the decoy server of a support provider.

It is the characteristic of the system that the network device of a service user regularly encapsulates the log information and transfers the log information to the service provider, the control system of the data center analyzes the log information, and when an illegal access is detected, the set information of the illegal access detection of the network device is updated.

It is the characteristic of the system that security level is improved for packets to be transmitted/received by the centralized control service by adding authentication information or enciphering.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An illegal access data handling apparatus, comprising:
a control system; and
a decoy server, functionally coupled to the control system, wherein the apparatus is placed outside a given internal communication network, for receiving illegal access data transmitted from a data communication device placed outside the internal communication network for a purpose of illegally accessing the internal communication network, and for taking countermeasures against the illegal access data received, further wherein the countermeasures include providing a response pretending to originate from the internal communication network,
the response being encapsulated and sent to a network device within said given internal communication network to be decapsulated and transmitted by the network device to said data communication device.

2. The illegal access data handling apparatus of claim 1, wherein the illegal access data handling apparatus is connected to an illegal access data detection device for relaying a data communication between a data communication device placed within the internal communication network and a data communication device placed outside the internal n communication network, and for detecting the illegal access data, and
wherein the illegal access data handling apparatus receives the illegal access data from the illegal access data detection device.

3. The illegal access data handling apparatus of claim 2, further comprising:
a data reception section for receiving the illegal access data from the illegal access data detection device;
a data analysis section for analyzing the illegal access data received by the data reception section;
a response data generation section for generating response data to the illegal access data based upon an analysis result from the data analysis section; and
a data transmission section for transmitting the response data generated by the response data generation section to the illegal access data detection device.

4. The illegal access data handling apparatus of claim 3, wherein the data reception section receives an encapsulated illegal access data from the illegal access data detection device,
wherein the illegal access data handling apparatus further includes a capsulation section for decapsulating the encapsulated illegal access data received by the data reception section to extract the illegal access data, and encapsulates the response data, and
wherein the data transmission section transmits the response data encapsulated by the capsulation section to the illegal access data detection device.

5. The illegal access data handling apparatus of claim 3, wherein the response data generation section generates response data having same contents as those of response data that would be generated by a specific data communication device placed in the internal communication network in response to the illegal access data if the specific data communication device received the illegal access data.

6. The illegal access data handling apparatus of claim 3, wherein the data reception section receives from the illegal access data detection device communication history information indicating a communication history of the illegal access data detection device,
wherein the data analysis section analyzes the communication history information received by the data reception section, and generates illegal access data designation information designating data transmitted from a given data communication device placed outside the internal communication network as the illegal access data based upon an analysis result of the communication history information, and
wherein the data transmission section transmits the illegal access data designation information generated by the data analysis section to the illegal data detection device.

7. The illegal access data handling apparatus of claim 4, wherein the data reception section receives the illegal access data having authentication information attached to be used for data authentication from the illegal access data detection device, and
wherein the capsulation section performs the data authentication for the illegal access data by using the authentication information.

8. The illegal access data handling apparatus of claim 7, wherein the capsulation section attaches the authentication information to be used for the data authentication for the response data to the response data, and
wherein the data transmission section transmits the response data having the authentication information attached by the capsulation section to the illegal access data detection device.

9. A method for handling illegal access data outside a given internal communication network, the method comprising:
receiving illegal access data transmitted from a data communication device placed outside the internal communication network for a purpose of illegally accessing the internal communication network; and
taking countermeasures against the illegal access data received by a data center remotely located over the Internet from the internal network, wherein the countermeasures include providing a response pretending to originate from the internal communication network,
the response being encapsulated by the data center and sent to a network device within said internal communication network to be decapsulated and transmitted by the network device to said data communication device.

10. The method of claim 9, comprising:
communicating with an illegal access data detection device for relaying a data communication between a data communication device placed within the internal communication network and a data communication device placed outside the internal communication network, and for detecting the illegal access data; and
receiving the illegal access data from the illegal access data detection device.

11. The method of claim 10, comprising:
receiving the illegal access data from the illegal access data detection device;
analyzing the illegal access data received by the receiving;

generating response data to the illegal access data based upon an analysis result from the analyzing; and transmitting the response data generated by the generating to the illegal access data detection device.

12. The method of claim 10, generates response data having same contents as those of response data that would be generated by a specific data communication device placed in the internal communication network in response to the illegal access data if the specific data communication device received the illegal access data.

13. A method for responding to unauthorized access packet to an internal communications network, comprising:

receiving an encapsulated unauthorized access packet at a data center placed outside the internal network, and wherein the unauthorized access packet is redirected from a target server residing within the internal network;

analyzing the received packet to formulate a response packet;

encapsulating the response packet so that it appears to originate from the target server; and sending the encapsulated response packet to a network device, wherein the network device is within the internal network, and wherein the network device decapsulates the encapsulated response packet and forwards the decapsulated packet to the source of the unauthorized access packet.

14. The method according to claim 13, further comprising:

determining if the encapsulated unauthorized access packet was transmitted from a client;

judging whether data of the encapsulated unauthorized access packet came from an unauthorized source;

analyzing the encapsulated unauthorized access packet based upon data from a knowledge base; and notifying a decoy server of the analysis result.

15. The method according to claim 14, further comprising:

referring to a client database; and collating the encapsulated unauthorized access packet with information contained in the client database.

16. The method according to claim 14, further comprising:

accessing a knowledge base having information associated with past encapsulated unauthorized access packets.

* * * * *